US011873732B2

(12) United States Patent
Onfray et al.

(10) Patent No.: US 11,873,732 B2
(45) Date of Patent: Jan. 16, 2024

(54) BLADE MADE OF MULTIPLE MATERIALS

(71) Applicant: SAFRAN AIRCRAFT ENGINES, Paris (FR)

(72) Inventors: Rémi Philippe Guy Onfray, Moissy-Cramayel (FR); Dorian Alexandre Alban Bantwell, Moissy-Cramayel (FR); Alix Thomas Bernard Lejeune, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/995,497

(22) PCT Filed: Apr. 1, 2021

(86) PCT No.: PCT/FR2021/050573
§ 371 (c)(1),
(2) Date: Oct. 5, 2022

(87) PCT Pub. No.: WO2021/205098
PCT Pub. Date: Oct. 14, 2021

(65) Prior Publication Data

US 2023/0175402 A1 Jun. 8, 2023

(30) Foreign Application Priority Data

Apr. 9, 2020 (FR) ........................................ 2003604

(51) Int. Cl.
*F01D 5/14* (2006.01)
*F01D 5/28* (2006.01)

(52) U.S. Cl.
CPC ............. *F01D 5/147* (2013.01); *F01D 5/282* (2013.01); *F05D 2300/603* (2013.01)

(58) Field of Classification Search
None
See application file for complete search history.

(56) References Cited

U.S. PATENT DOCUMENTS 3,294,366 A * 12/1966 Coplin .................... F01D 5/147
416/241 A
4,118,147 A * 10/1978 Ellis .......................... F01D 5/16
416/500

(Continued)

FOREIGN PATENT DOCUMENTS

DE 10 2013 219 772 A1 4/2015
EP 0 764 763 A1 3/1997

(Continued)

OTHER PUBLICATIONS

Cao et al—CN-107542498-A + machine translation (Year: 2018).*

(Continued)

*Primary Examiner* — Juan G Flores
(74) *Attorney, Agent, or Firm* — Oblon, McClelland, Maier & Neustadt, L.L.P.

(57) ABSTRACT

A vane of a turbine engine blade includes a first portion of structural resistance formed by two end portions including the leading and trailing edges and end strips of the lower surface and the upper surface, and of a core joining them. Two other portions of the blade are constructed of light material, composite for example, between the end portions to reconstitute the complete vane. The core has an oblique or diagonal extension between the end portions.

15 Claims, 5 Drawing Sheets

(56) References Cited

U.S. PATENT DOCUMENTS

Figure 1:
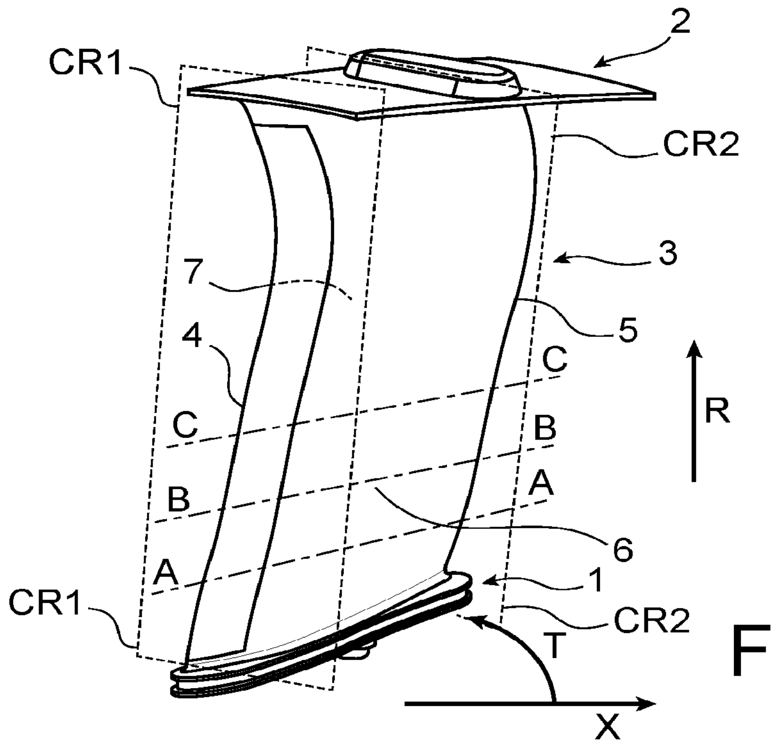

| | | | | |
|---|---|---|---|---|
| 4,178,667 | A * | 12/1979 | Stevens | F01D 5/16 73/147 |
| 5,655,883 | A | 8/1997 | Schilling | |
| 7,547,194 | B2 * | 6/2009 | Schilling | F01D 5/282 416/241 A |
| 7,963,745 | B1 | 6/2011 | Liang | |
| 2008/0253887 | A1 | 10/2008 | Cairo et al. | |
| 2016/0153295 | A1 | 6/2016 | Pautard et al. | |
| 2016/0258303 | A1 | 9/2016 | Rosenau | |
| 2018/0030995 | A1 * | 2/2018 | Weisse | F02K 3/06 |

FOREIGN PATENT DOCUMENTS

| | | | |
|---|---|---|---|
| EP | 1 980 714 | A2 | 10/2008 |
| FR | 3 012 515 | A1 | 5/2015 |

OTHER PUBLICATIONS

International Search Report dated Aug. 5, 2021, in PCT/FR2021/050573, filed on Apr. 1, 2021, 3 pages.

Preliminary French Search Report dated Nov. 16, 2020, French 2003604 filed on Apr. 9, 2020, 3 pages (with Translation of Categories of Cited Documents).

* cited by examiner

BLADE MADE OF MULTIPLE MATERIALS

The subject of the invention is a blade made of multiple materials.

The constant search for lighter turbomachines in aeronautics has also extended to blades. Various designs of hollow blades have already been proposed, but their use is not always possible. Another way to lighten the blades then consists in using lighter materials, such as composite materials; but this method also includes limitations, since lightweight materials generally do not have the desired resistance for the most loaded portions of the blades, such as the leading edges exposed to shocks and wear due to solid impurities entrained with gases; moreover, they generally do not allow the leading edges and the trailing edges to be shaped with sufficient finesse.

It was then proposed (this is the subject of document FR 3035679 A, among others) to reinforce a massive blade, constructed of a light material, by a reinforcement made of a thin sheet of foil made of a resistant material, which is folded to cover the main material on a small strip of the lower surface face and the upper surface face. Blades that are both light and sufficiently resistant in service are then obtained. However, these local reinforcements also have certain disadvantages: the shaping of the foil is difficult at first, because of the lack of rigidity of this thin and slender part, and which must be shaped into a complicated and irregular shape, the edges of the recent blades often having significant and highly variable inclinations in the axial direction and the tangential direction (known as the sag and dihedral angles); and even constructed with a very thin sheet of foil, the reinforcements give too thick and rounded folds to build quite thin and sharp blade edges.

An improved blade construction, but perfected by the invention, is also disclosed in U.S. Pat. No. 3,294,366 A.

Another construction is proposed according to the invention. Said construction includes, according to a general definition, a blade comprising a reinforced leading edge, a trailing edge, and extending between the leading edge and the trailing edge while being limited by a lower surface face and an upper surface face which are two main aerodynamic faces of the blade, opposite in a direction of the thickness of the blade and each extending from the leading edge to the trailing edge; the blade being formed of a first portion, made in one piece of a first material, made of a first end portion comprising the leading edge, of a second end portion comprising the trailing edge and of a core connecting the first end portion to the second end portion, the first end portion and the second end portion each comprising a strip of each of the main aerodynamic faces; of a second portion, extending between the first end portion and the second end portion and joined to a main face of the core, made of a second material lighter than the first material, and carrying a zone of a first one of the main aerodynamic faces between the strips of said first aerodynamic face belonging to each of the end portions; and of a third portion, which is, like the second portion, made of a material that is lighter than the first material, and which carries a zone of the second one of the main aerodynamic faces between the strips of said second aerodynamic face which belong to the end portions of the first portion; characterised in that the core has, over at least a portion of the height of the blade, an oblique extension in the direction of thickness, which causes the second portion to have a greater thickness near the second end portion than near the first end portion, and the third portion to have a greater thickness near the first end portion than near the second end portion.

The leading and trailing edges are constructed as rigid portions of the lower surface face and upper surface face over at least most of their extension, rather than being formed of curved foil sheets. Both greater ease of manufacture of the leading and trailing edges thanks to the rigidity of these end portions, and the ability to construct leading and trailing edges with a sharp section are obtained. The core ensures the cohesion of the assembly by taking up the forces that appear in the vane. And the second portion can be much larger than the first one, thus allowing a significant overall lightening. Its cohesion with the first portion is good, since it is disposed in a cavity formed by the latter between the end portions, which project from the core in the direction of thickness of the vane. The mechanical resistance of the second portion can be low since the forces undergone by the vane are taken up by the first one: the second portion is justified in order to restore a continuous main surface, and therefore of good aerodynamic quality, of the vane. The third portion has the same properties as the second one.

Both the second portion and the third portion can be constructed from the second material.

The first and second end portions are often chosen solid (and thicker than the core in the direction of thickness) to give them sufficient strength.

The considerations of resistance or rigidity with regard to static or dynamic forces, comprising vibrations, are important for the precise definition of the parameters of shape and dimensions of the blade, and here especially of the core and the first portion. An important idea is that the sections of the blade taken at different radii differ as to the position of the core, which can therefore have buckling, that is to say uniform or non-uniform inclinations in the angular direction of the turbomachine along the radial direction; or twists (rotations) around the radial direction, from one cut to another. This results in certain particular constructions, according to which:

- in sections taken through the blade, in the radial direction of the blade and from the lower surface face to the upper surface face and over a portion of the height of the blade, one of the second portion and the third portion has an increasing thickness in an outward direction of the radial direction, and the other of the second portion and the third portion has a decreasing thickness in said outward direction;
- in a first section taken through the blade, adjacent to the first end portion, in the radial direction of the blade and from the lower surface face to the upper surface face and over a portion of the height of the blade, one of the second portion and the third portion has an increasing thickness in an outward direction of the radial direction, and the other of the second portion and the third portion has a decreasing thickness in said outward direction; and, in a second section taken through the blade, adjacent to the second end portion, in the radial direction of the blade and from the lower surface face to the upper surface face and over a portion of the height of the blade, said one of the second portion and the third portion has a decreasing thickness in an outward direction of the radial direction, and said other of the second portion and the third portion has an increasing thickness in said outward direction.

Such constructions may extend over the entire height of the blade in the radial direction, or over only a portion of this height. Thus, according to advantageous constructions, said height portion of the blade has an extension of at least 30% in height; the height varying from 0% at a radially inner end of the blade to 100% at a radially outer end of the blade; or again, said height portion of the blade extends between the heights of 20% and 80% between these ends.

According to other construction possibilities, the second portion and/or the third portion has a thickness (at least over a portion of the height of the blade) continuously decreasing towards zero in the direction of one of the end portions, that is to say that the core can be connected to the end portions, or to one of them only, at the lower surface or the upper surface.

According to certain embodiments considered for the invention, the first end portion and the second end portion are connected to the core by rear faces, respectively opposite the leading edge and the trailing edge, which are essentially planar, and the core is a rigid plate delimited by two main and opposite faces which are smooth.

The core can also have a variable thickness from the first end portion to the second end portion, depending on its desired resistance properties.

The first material will generally be metallic and chosen for its resistance, while the second material (and that of the third portion, if it is different from the second material) may be made of composite material, or of polymer (resistant to high temperatures) to provide the desired lightening. The assembly of the second portion and the third portion to the first portion will normally be easy, since they are located in a cavity or cavities of the first portion, wherein they can be moulded or formed, producing a good cohesion by adherence to the first portion.

Figure 2:
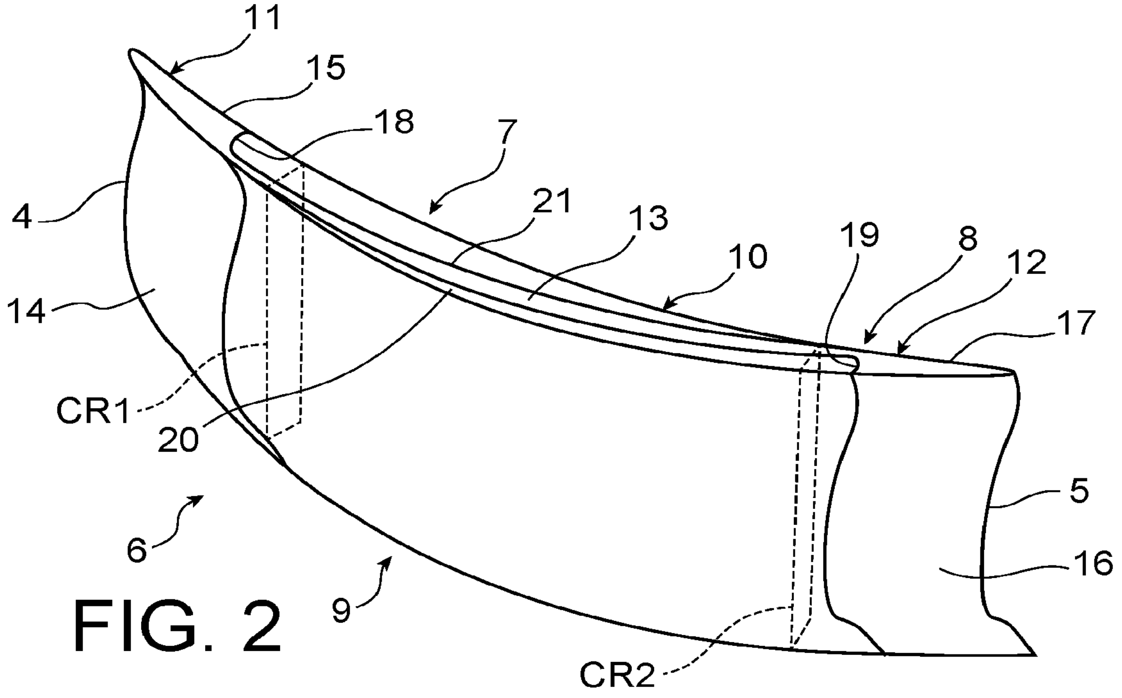
Figure 3:
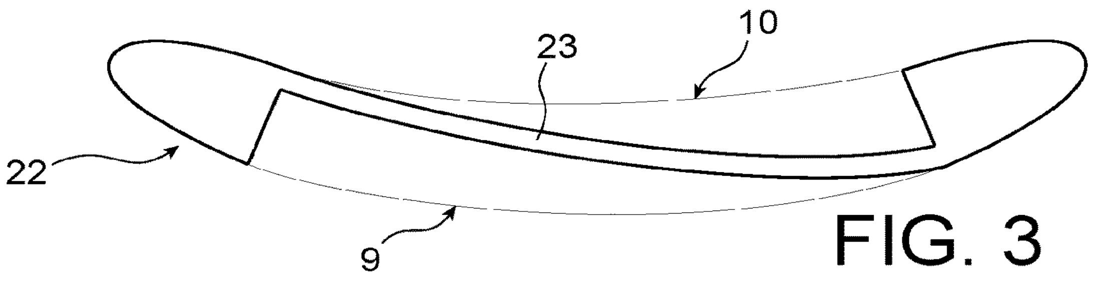
Figure 4A:
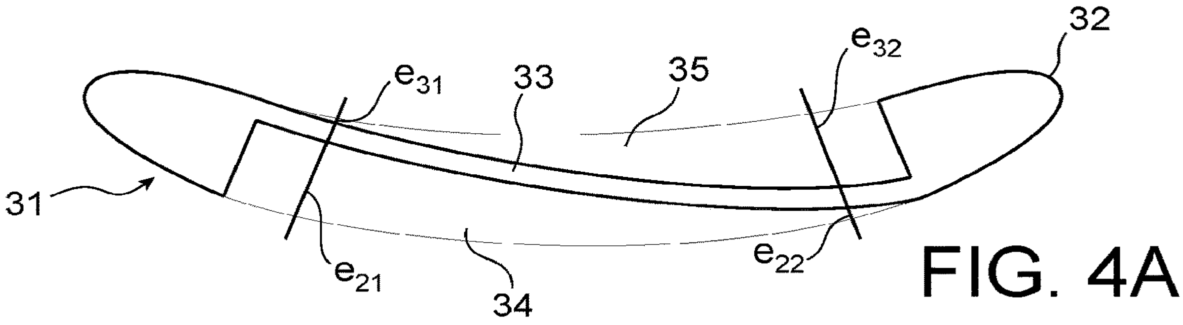
Figure 4B:
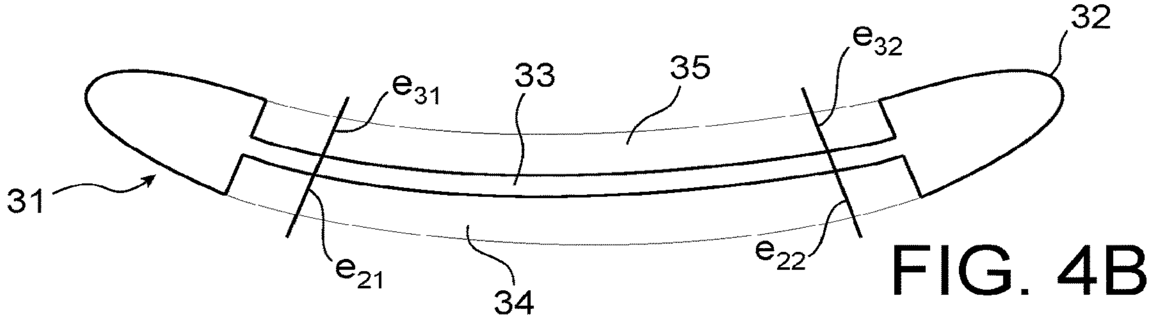
Figure 4C:
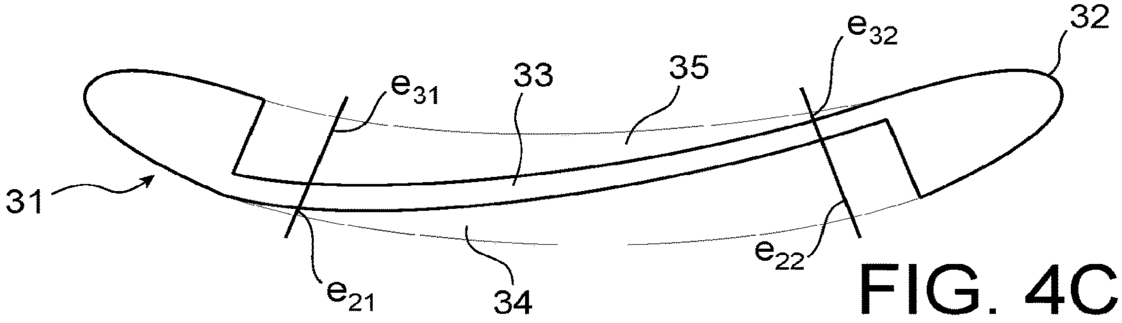
Figure 5A:
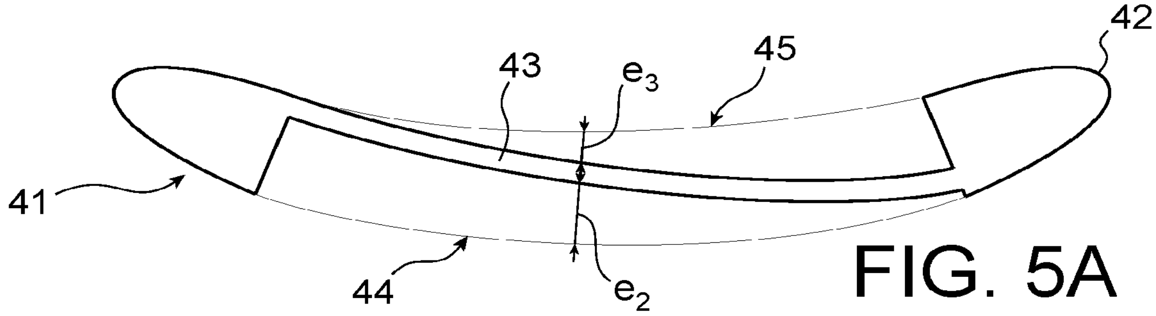
Figure 5B:
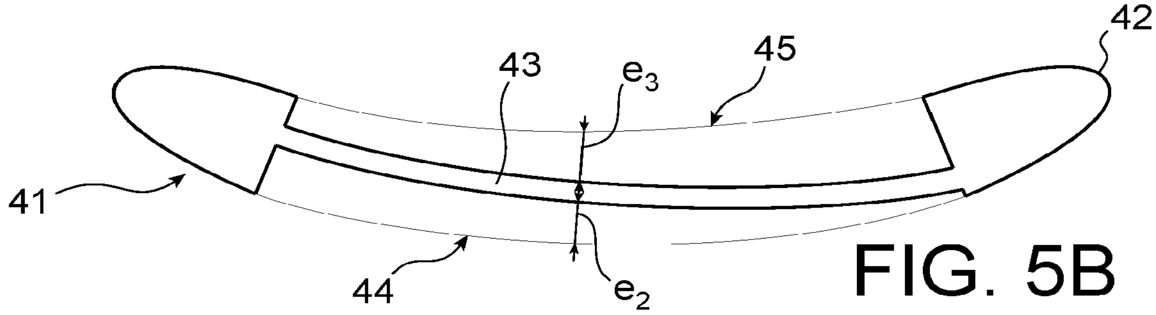
Figure 5C:
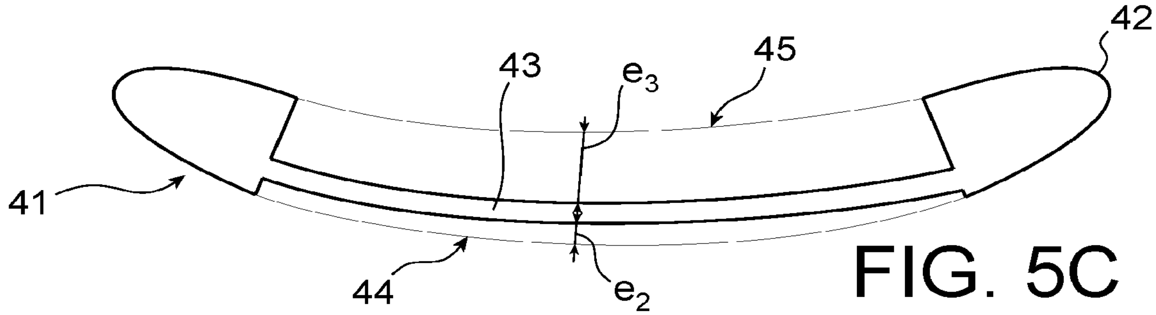
Figure 6:
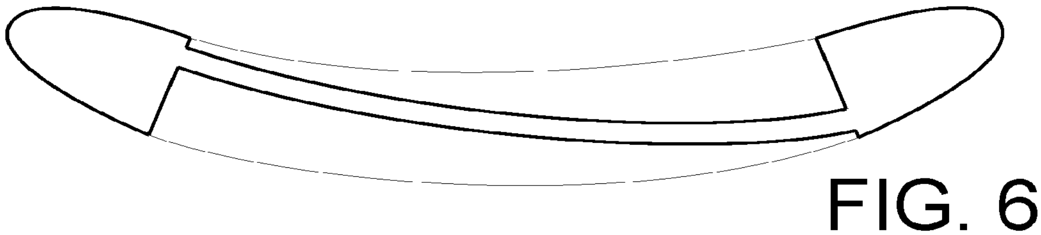
Figure 7:
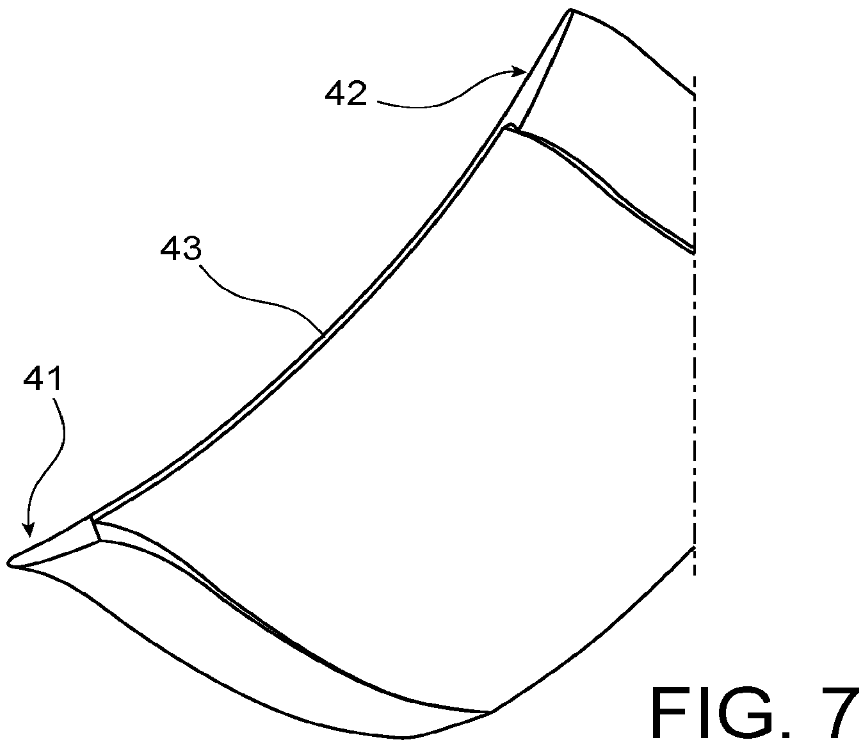
Figure 8:
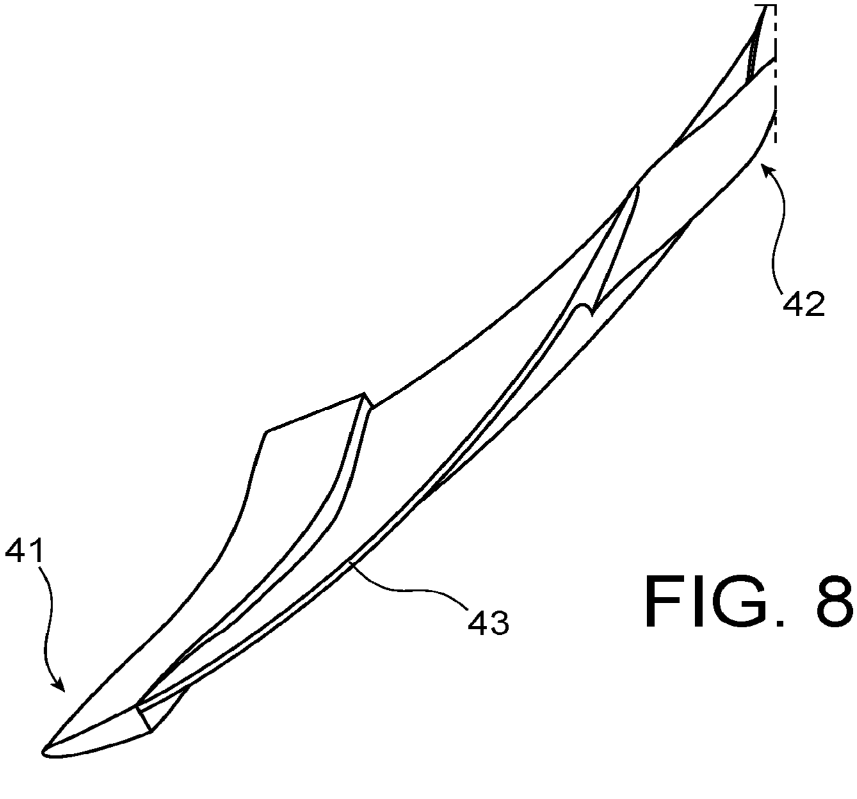
Figure 9:
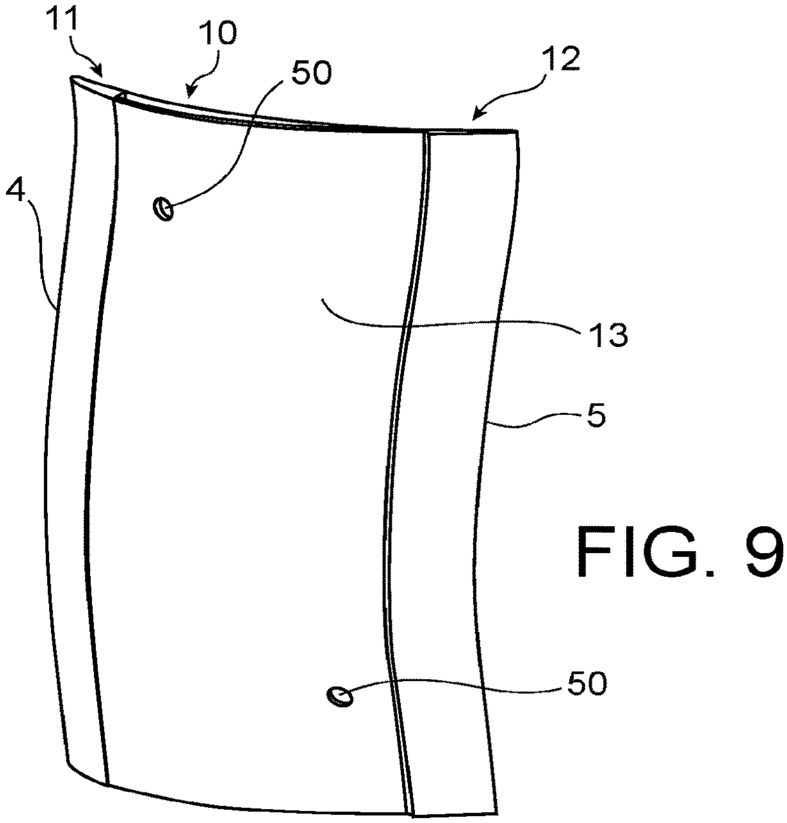
Figure 10:
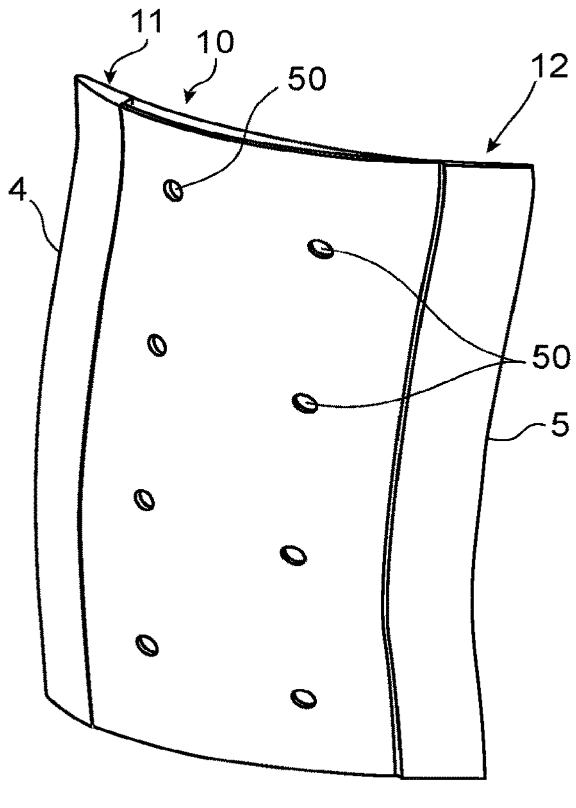

The invention will now be described in its various aspects, features and advantages by means of the following figures, which illustrate certain embodiments given purely by way of illustration:

FIG. 1, a general perspective view of the blade;

FIG. 2, a first embodiment of the invention, in section;

FIG. 3, a section of a second embodiment;

FIGS. 4A, 4B and 4C, three successive sections of a third embodiment;

FIGS. 5A, 5B and 5C, three successive sections of a fourth embodiment;

FIG. 6, a section of a fifth embodiment;

FIG. 7, a perspective view of the fourth embodiment of the invention;

FIG. 8 is a perspective view, in an opposite orientation, of the fourth claim;

FIG. 9, a view of a possible layout detail;

and FIG. 10, another embodiment of such a detail.

FIG. 1 shows a general view of a blade, such as a compressor blade, to which the invention can be applied: the blade comprises an inner platform 1 at an inner radial end, an outer platform 2 at an outer radial end, and a vane 3 joining the platforms 1 and 2 and on which the invention is implanted. The vane 3 is intended to extend in a gas flow path, where it can be exposed to high temperatures, as well as shocks from various solid impurities entrained in the gas stream. It comprises a leading edge 4, a trailing edge 5, and it is limited by two curved aerodynamic faces both joining the leading edge 4 to the trailing edge 5, including an upper surface face 6 and a lower surface face 7 which are opposite in the direction of thickness T of the vane 3. For each section of the vane 3, with a constant radius in a radial direction R, a direction of elongation X extending from the leading edge 4 to the trailing edge 5 will be considered, in addition to the direction of thickness T, these three directions being perpendicular. A height parameter on the blade, measured from 0% at the inner platform 1, to 100% at the outer platform 2 in the radial direction R will also be defined.

FIG. 2 details the structure of the vane 3. It is made of a first portion 8 and, in this embodiment, of a second portion 9 and of a third portion 10. The first portion 8 has a role of structural rigidity and is normally constructed of metal. It includes a first end portion 11, a second end portion 12 and a core 13 joining these end portions 11 and 12. The first end portion 11 comprises the leading edge 4 and two end strips 14 and 15 of the upper surface face 6 of the lower surface face 7, which are joined to each other at the leading edge 4. The second end portion 12 comprises the trailing edge 5 and two end strips 16 and 17 of the upper surface face 6 and of the lower surface face 7, which are joined to each other at the trailing edge 5. The strips 14 and 16, as well as the strips 15 and 17, however, occupy a small portion of the width of the upper surface and lower surface faces 6 and 7 (in the direction of elongation X). The end portions 11 and 12 are solid, that is to say they have a solid section and extend, in the direction of thickness T of the vane 3, continuously from the end strip 14 or 15 of the upper surface face 6 to the end strip 16 or 17 of the lower surface face 7, and therefore they occupy the entire thickness of the vane 3 at the leading edge 4 and at the trailing edge 5 and close to them (their ends opposite the leading 4 or trailing 5 edges respectively can however be connected by a rear face 18 or 19 that is flat or slightly concave, which is shown here).

The core 13 is a spacer which joins the end portions 11 and 12 by their rear faces 18 and 19. It is made integrally therewith and can consist of a plate or a curved rigid veil, extending between two main faces 20 and 21 which can be smooth or, on the contrary, stiffened. Its thickness is variable here, greater in the centre than near the end portions 11 and 12. It is determined, with or without an evolution or variations between the end portions 11 and 12, depending on the static or dynamic mechanical strength to be obtained for the blade, and which indeed depends a great deal on the features of the core 13. In any event, the thickness of the core 13 is markedly smaller than that of the end portions 4 and 5, with the consequence that the core 13 occupies only a small portion of the volume of the vane 3 between these portions. Abrupt transitions in thickness between the core 13 and the end portions 11 and 12 are accepted, and present here.

The second portion 9 and the third portion 10 extend in cavities delimited by the core 13 and the end portions 11 and 12, on opposite sides of the core 13. The second portion 9 is delimited mainly by the main face 20 of the core 13, the rear face 19 of the second end portion 12 and the strip 14 on the side of the upper surface 6 of the first end portion 11. The third portion 7 is delimited by the other main face 21 of the core 13, the rear face 18 of the first end portion 11 and the strip 17 on the side of the lower surface 7 of the second end portion 12. The second portion 9 and the third portion 10 respectively carry the largest portion of the area of the upper surface 6 between the strips 14 and 16, and of the area of the lower surface 7 between the strips 15 and 17. They are constructed of materials which are lighter than that of the first portion 8, for example made of composite material or polymer. They can be moulded in the cavities of the first portion 8. The vane 3 is both rigid thanks to the first portion 8, resistant thanks to the end portions 11 and 12, and light thanks to the large volume of the second portion 9 and the third portion 10. The zones of the upper surface 6 and the lower surface 7 which belong to the second portion 9 and to the third portion 10 perfectly extend the strips 14, 15, 16 and 17 and therefore give a continuous and regular shape to the upper surface 6 and the lower surface 7, and good aerodynamic quality on the vane 3. In other words, the second portion 9 and the third portion 10 each extend between the two end portions 11 and 12 and respectively carry a portion of the aerodynamic faces of the upper surface 6 and lower surface 7, which are positioned to ensure the continuity of said upper surface 6 and lower surface 7 faces with the strips 14, 15, 16 and 17 and complete said faces with said strips.

Other alternative embodiments will now be described.

FIG. 3 shows an alternative embodiment, which illustrates a core 23 of the first portion, now 22, whose thickness is uniform in the direction of elongation X, but otherwise similar to the embodiment of FIG. 2.

Compared to blades such as the embodiments of U.S. Pat. No. 3,294,366 A, it is therefore proposed here to make the connecting core of the end portions oblique through the thickness dimension of the blade, along its length dimension. This new design allows to reinforce the blade by stiffening it further (it would be possible to reinforce this effect by giving the core a curved meander or transverse rib shape for example) and by increasing the cohesion of the second and the third portion, whose tapered shape includes both a more massive portion at one tip, and a more flexible portion at the opposite tip, compared to portions whose thickness would be more or less constant. The thickness of the core can be scalable in the radial direction to take into account the aerodynamic forces undergone by the part. The core 13 can have a changing shape depending on the section of the vane considered. This will be described more concretely by means of the following figures.

Let us consider three sections A-A, B-B and C-C, shown in FIG. 1 and taken at three different heights of the blade in the radial direction R, and compare them. In certain embodiments of the invention, shown in FIGS. 4A, 4B and 4C, the core, now 33, has a twisted shape, that is to say that its successive sections are deduced from each other by rotations around the radial direction R, which cause it to switch for example from a shape similar to that of FIG. 3, where it joins the first end portion 31 at the lower surface and the second end portion at the upper surface, into the reverse shape of FIG. 4C, where it joins the first end portion 31 at the upper surface and the second end portion 32 at the lower surface; intermediate shapes exist between these two heights, as shown in FIG. 4B according to which the core 33 joins the two end portions 31 and 32 approximately at mid-thickness. In other words, the thicknesses $e_2$ and $e_3$ of the second portion 34 and of the third portion 35 of the blade are respectively decreasing and increasing ($e_{21}$ and $e_{31}$) along a first radial section of the blade (CR1-CR1 in FIG. 1, taken in the radial direction R and the direction of thickness of the blade adjacent to the first end portion 31) in the radially outer direction (towards the outer platform 2); and the reverse is true along another radial section (CR2-CR2, adjacent to the second end portion 32), where the thicknesses $e_{22}$ and $e_{32}$ of the second portion 34 and of the third portion 35 are respectively increasing and decreasing in the outer radial direction.

Another possible construction is shown in FIGS. 5A, 5B and 5C, according to which the core, now 43, has a veiled shape inclined in the angular direction of the turbomachine, that is to say that its successive sections are deduced from each other mainly by rotations in the axial direction: the direction of thickness of the blade: the core 43 is closer to the lower surface in FIG. 5A, closer to the upper surface in FIG. 5B, and even closer to the upper surface in FIG. 5C. In other words, the thicknesses $e_2$ of the second portion 44 are decreasing in the outer radial direction, and the thicknesses $e_3$ of the third portion 45 are increasing. In addition, this evolution is irregular along each section of the core 43: the position of the core 43 in the direction of the thickness and along the height of the blade varies greatly near the first end portion 41, and slightly, if at all, close to the second end portion 42. FIGS. 7 and 8 illustrate this embodiment more completely.

Opposite evolutions are possible.

Such constructions of the core will generally be chosen for their resistance to static or aerodynamic forces, or their rigidity to vibrations, associated with the specific embodiments of the blade; they will be determined by tests or calculations on models.

Different and possibly more complex constructions than those described here may also be proposed. This is how the changing shape may concern only a portion of the core, an additional portion then having a regular shape in the radial direction R. The evolution of the shape may be present only over a portion of the height of the blade, for example over an extent of 30% of the total height, or for example also in the zone comprised between the heights of 20% and 80% between the inner 1 and outer 2 platforms, at the heights of 0% and 100%.

There is also no rule about the thickness of the core, which may or may not be variable in the radial direction as well as in the perpendicular direction, for example thicker at the platforms (or more generally at the radial ends) than at mid-height, or thicker at the connections at the end portions than at mid-length between these portions.

The adhesion of the second and the third portion to the third portion can be obtained in various ways: by overmoulding, by gluing or by interlocking of the protruding portions of the second and of the third portion in corresponding concavities of the first portion (for example present on the rear faces 18 and 19, as seen).

A completely different way of ensuring the coherence of the blade consists in providing the core, for example the core 13, with bores 50 which allow the second portion and the third portion, for example 9 and 10, to be joined directly, their material filling the bores 50. Overmoulding is then a particularly suitable manufacturing method. FIG. 9 shows a construction with two radially and axially opposite bores 50, and FIG. 10 a construction with eight bores distributed in a regular rectangular array. The number, arrangement and width of the bores 50 are chosen according to the desired cohesion; like any variations in thickness at places less stressed mechanically, the bores also have the effect of lightening the core and therefore the blade. FIGS. 9 and 10 also show the embodiment of FIG. 3, for which the core 13 has almost superimposable sections over the entire height, joining the first end portion 11 at the upper surface 6 and the second end portion 12 at the lower surface 7, but similar bores could be made in all the other embodiments considered here.

Finally, it is not necessary for the core to join the end portions at the lower surface or the upper surface: the second portion and the third portion can keep a non-zero thickness at these places, and at all heights of the blade, which has been shown by means of FIG. 6.

The invention claimed is:

1. A blade comprising:

a reinforced leading edge, a trailing edge, and extending between the leading edge and the trailing edge while being limited by a lower surface face and an upper surface face which are two main aerodynamic faces of the blade, opposite in a direction of the thickness of the blade and each extending from the leading edge to the trailing edge; the blade being formed of a first portion, made in one piece of a first material, made of a first end portion comprising the leading edge, of a second end portion comprising the trailing edge and of a core connecting the first end portion to the second end portion, the first end portion and the second end portion each comprising a strip of each of the main aerodynamic faces; of a second portion, extending between the first end portion and the second end portion and joined to a main face of the core, made of a second material lighter than the first material, and carrying a zone of a first one of the main aerodynamic faces between the strips of said first aerodynamic face belonging to each of the end portions; and of a third portion, joined to a second main face, opposite the first main face, of the core, carrying a zone of a second one of the main aerodynamic faces between the strips of said second aerodynamic face belonging to each of the end portions, and made of a material lighter than the first material; wherein the core has, over at least a portion of the height of the blade, an oblique extension in the direction of thickness, the second portion having a greater thickness adjacent the second end portion than adjacent the first end portion, and the third portion having a greater thickness adjacent the first end portion than adjacent the second end portion.

2. The blade according to claim 1, wherein the first end portion and the second end portion are connected to the core by rear faces, opposite the leading edge and the trailing edge, which are essentially planar.

3. The blade according to claim 1, wherein the core is a rigid plate delimited by two main and opposite smooth faces.

4. The blade according to claim 3, wherein the plate has a variable thickness between the first end portion and the second end portion.

5. The blade according to claim 1, wherein the second portion and the third portion are both constructed from the second material.

6. The blade according to claim 1, wherein the first material is metallic.

7. The blade according to claim 1, wherein the second material and the material of the third portion are made of composite or polymer.

8. The blade according to claim 7, wherein the second portion and the third portion are moulded or formed in the first portion.

9. The blade according to claim 1, wherein the first and the second end portion are solid and thicker than the core in said direction of thickness.

10. The blade according to claim 1, wherein, in sections taken through the blade, in the radial direction of the blade and from the lower surface face to the upper surface face and over a portion of the height of the blade, one of the second portion and the third portion has an increasing thickness in an outward direction of the radial direction, and the other of the second portion and the third portion has a decreasing thickness in said outward direction.

11. The blade according to claim 10, wherein the height portion of the blade has an extension of at least 30% in height; the height varying from 0% at a radially inner end of the blade to 100% at a radially outer end of the blade.

12. The blade according to claim 11, wherein the height portion of the blade extends between a height of 20% and a height of 80% between the radially inner and outer ends of the blade.

13. The blade according to claim 1, wherein, in a first section taken through the blade, adjacent to the first end portion, in the radial direction of the blade and from the lower surface face to the upper surface face and over a portion of the height of the blade, one of the second portion and the third portion has an increasing thickness in an outward direction of the radial direction, and the other of the second portion and the third portion has a decreasing thickness in said outward direction; and, in a second section taken through the blade, adjacent to the second end portion, in the radial direction of the blade and from the lower surface face to the upper surface face and over a portion of the height of the blade, said one of the second portion and the third portion has a decreasing thickness in an outward direction of the radial direction, and said other of the second portion and the third portion has an increasing thickness in said outward direction.

14. The blade according to claim 1, wherein the second portion and/or the third portion has a thickness, at least over a portion of the height of the blade, continuously decreasing towards zero in the direction of one of the end portions.

15. The blade according to claim 1, further comprising bores through the core, through which the second portion and the third portion are joined.

* * * * *